United States Patent
Hoshizuki

(10) Patent No.: US 11,323,241 B2
(45) Date of Patent: May 3, 2022

(54) ENCRYPTION PROCESSING SYSTEM, ENCRYPTION PROCESSING DEVICE AND RECORDING MEDIUM

(71) Applicant: AXELL CORPORATION, Tokyo (JP)

(72) Inventor: Yusuke Hoshizuki, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 160 days.

(21) Appl. No.: 16/832,136

(22) Filed: Mar. 27, 2020

(65) Prior Publication Data

US 2020/0374101 A1 Nov. 26, 2020

(30) Foreign Application Priority Data

May 21, 2019 (JP) .............................. JP2019-095289

(51) Int. Cl.
*H04L 9/00* (2022.01)
*H04L 29/06* (2006.01)
*H04L 9/06* (2006.01)

(52) U.S. Cl.
CPC ............ *H04L 9/008* (2013.01); *H04L 9/0618* (2013.01); *H04L 63/0428* (2013.01)

(58) Field of Classification Search
CPC ... H04L 9/008; H04L 9/0618; H04L 63/0428; H04L 2209/46
See application file for complete search history.

(56) References Cited

U.S. PATENT DOCUMENTS

| 8,316,237 B1 * | 11/2012 | Felsher | H04L 9/0825 |
| | | | 713/171 |
| 2010/0046746 A1 * | 2/2010 | Yonemura | H04L 9/3033 |
| | | | 380/30 |

(Continued)

FOREIGN PATENT DOCUMENTS

| JP | 2012-49679 | 3/2012 |
| WO | 2016/039651 | 3/2016 |

OTHER PUBLICATIONS

Decision of Refusal dated Jul. 20, 2021 in Japanese Patent Application No. 2019-095289, with English-language translation.

(Continued)

*Primary Examiner* — Meng Li
(74) *Attorney, Agent, or Firm* — Wenderoth, Lind & Ponack, L.L.P.

(57) ABSTRACT

An encryption processing system includes: an encryption data generation device, an encryption processing device, and a processing result utilization device. A first processor of the encryption data generation device is configured to perform preprocessing by generating encrypted data of homomorphic encryption corresponding to data obtained by multiplying plaintext data as a target by a power of a predetermined number of two or more. A second processor of the encryption processing device is configured to perform acquiring the encrypted data, and executing a processing on the encrypted data in an encrypted state to obtain a processing result in the encrypted state. A third processor of the processing result utilization device is configured to perform acquiring the processing result, and postprocessing by decrypting data of the processing result in the encrypted state and by dividing the decrypted data by the power of the predetermined number of two or more.

8 Claims, 8 Drawing Sheets

(56) References Cited

U.S. PATENT DOCUMENTS

| | | | |
|---|---|---|---|
| 2012/0054485 A1 | 3/2012 | Tanaka et al. | |
| 2015/0039661 A1* | 2/2015 | Blomgren | H03M 7/24 |
| | | | 708/204 |
| 2017/0078086 A1* | 3/2017 | Rohloff | H04L 9/06 |
| 2018/0139190 A1 | 5/2018 | Chaum | |
| 2019/0199510 A1 | 6/2019 | Hoshizuki et al. | |
| 2021/0192509 A1* | 6/2021 | Eskandarian | G06Q 20/4014 |

OTHER PUBLICATIONS

Office Action dated Mar. 17, 2020 in corresponding Japanese Patent Application No. 2017-248185 with English-language translation.
Notice of Reasons for Refusal dated Jun. 1, 2021 in Japanese Patent Application No. 2019-095289, with English-language translation.
Hayashi, T., "Secret calculation using quasi-formal cryptography, and applications thereof", Systems Control Information, Feb. 15, 2019, vol. 63, No. 2, pp. 64-70, with partial English-language translation of pp. 67-68.
Kuri et al., "Privacy Preserving Extreme Learning Machine Using Additively Homomorphic Encryption", Computer Security Symposium, pp. 781-788, Oct. 23-25, 2017, Abstract Only.
Orlandi et al., "Oblivious Neural Network Computing via Homomorphic Encryption", EURASIP Journal on Information Security, vol. 2007, Article ID 37343, 11 pages (2007).

\* cited by examiner

ENCRYPTION PROCESSING SYSTEM, ENCRYPTION PROCESSING DEVICE AND RECORDING MEDIUM

CROSS-REFERENCE TO RELATED APPLICATIONS

This application is based upon and claims the benefit of priority of the prior Japanese Patent Application No. 2019-095289, filed on May 21, 2019, the entire contents of which are incorporated herein by reference.

BACKGROUND

Technical Field

The embodiments discussed herein are related to preventing data leakage and executing a wide range of processing.

Related Art

A neural network model as a machine learning architecture has been used to perform recognition processing (inference processing) of images, characters, sounds, and the like.

Coefficient data that has been learned in the neural network model is large in scale. If the processing is performed only on a client device, a load may be large or it may be difficult to execute the processing. Therefore, it is desired to use a cloud resource, which can perform large-scale operations by using a server-client model, for the inference processing using the neural network model.

When the server-client model is used, data to be processed is transmitted from a client device to a server, so that highly confidential data such as personal information included in the data may be leaked.

In order to address such a problem, it is conceivable to use a confidential operation method which performs operations while the data is encrypted. Broadly speaking, as for the confidential operation method, there is a method using homomorphic encryption and a method using multi-party-computation (MPC).

First, the method using the homomorphic encryption will be described.

The homomorphic encryption refers to an encryption method in which a set of a ciphertext and an operation having a homomorphic relationship with a plaintext and a certain operation exists. Strictly speaking, the homomorphic encryption is an encryption method which has a function G satisfying $Enc(F(a, b))=G(C1, C2)$, in which Enc refers to an encryption function with respect to plaintexts a, b and a two-variable function $F(a, b)$ thereof, while there is a ciphertext $c1=Enc(a)$ and a ciphertext $c2=Enc(b)$.

There are several types of homomorphic encryption, and a case where $F(a, b)=a+b$ is referred to as additive homomorphic encryption (AHE). In practice, even when $F(a, b)=a+b \mod n$, if the plaintext to be handled is sufficiently small, it can be regarded as substantially $a+b$, so it is also referred to as the additive homomorphic encryption.

A case where $F(a, b)=a \times b$ is referred to as multiplicative homomorphic encryption (MHE). In practice, even when $F(a, b)=a \times b \mod n$, if the plaintext to be handled is sufficiently small, it can be regarded as substantially $a \times b$, so it is also referred to as the multiplicative homomorphic encryption.

Fully homomorphic encryption (FHE) is known as homomorphic encryption that can handle both addition and multiplication operations. However, the fully homomorphic encryption is considered to be impractical since an amount of computation thereof is enormous as compared with capabilities of currently available computers.

Somewhat homomorphic encryption (SHE) is also known as homomorphic encryption that can handle both addition and multiplication operations, and an amount of computation thereof is reduced by providing an upper limit for the number of times of operations as compared with the fully homomorphic encryption.

For example, the specification of JP-A-2012-49679 discloses a terminal device including: an encrypting unit configured to encrypt data input by a fully homomorphic encryption method and generate encryption data; an encryption data transmitting unit configured to transmit the encryption data generated by the encrypting unit to a server; an encryption data receiving unit configured to receive the encryption data that has been subjected to a predetermined processing by the server; and a decoding unit configured to decode the encryption data which has been subjected to the predetermined processing. According to the technique of JP-A-2012-49679, the processing of input data can be delegated to the server without leaking contents of the input data to be processed to the server Meanwhile, the MPC refers to a system that operates encrypted data while performing communication using a plurality of computers. The MPC can perform a plurality of types of operations as compared with the homomorphic encryption.

In the neural network model, it may be difficult to process data in the encrypted state since a processing load thereof is heavy. For example, in "Research Article: Oblivious Neural Network Computing via Homomorphic Encryption" by C. Orlandi, A. Piva, and M. Barni, which is available on the Internet <http://clem.dii.unisi.it/~vipp/files/publications/S1687416107373439.pdf>, each time an activation function is operated, data is exchanged between a server and a client so as to execute the operation of the activation function on a client side. Therefore, in the technique of Non-Patent Literature 1, an amount of communication between the server and the client is increased, and processing time thereof becomes longer.

In the neural network model, in consideration of processing the data in the state of the encrypted data, the additive homomorphic encryption, whose available operations are limited, may not be able to execute neural network operations. In order to cope with such a problem, it is also conceivable to use the fully homomorphic encryption or the somewhat homomorphic encryption, which is capable of performing more types of operations. However, since an amount of data of encrypted data using such encryption is large, a processing load during the operation may increase.

Considering the point of reducing the processing load, it is preferable to use the additive homomorphic encryption to perform the processing. However, when the additive homomorphic encryption is used, the available operations are limited, and thus executable processings may be limited. For example, when the additive homomorphic encryption is used, a processing of executing non-integer multiplication (for example, multiplication of a number less than one (equivalent to division) is also included) cannot be executed. For example, in the neural network model, an operation is generally performed using floating-point format decimals. However, since the additive homomorphic encryption has a homomorphic relationship with integers, it seems natural to use fixed-point format decimals therein. However, when a fixed-point format decimal is multiplied, division is required for adjusting the number of bits of the fixed-point format decimal. As described above, since division cannot be performed in the additive homomorphic encryption, as a result, the additive homomorphic encryption cannot be used for data in which fixed-point format decimals are input.

In the case where the additive homomorphic encryption is used to perform the processing, executable processings may also be limited similarly in a processing which does not use the neural network model, besides the processing using the neural network model.

SUMMARY

According to an aspect of the present disclosure, there is provided an encryption processing system including: an encryption data generation device comprising at least one first processor; an encryption processing device comprising at least one second processor; and a processing result utilization device comprising at least one third processor, wherein the at least one first processor is configured to perform preprocessing by generating encrypted data of homomorphic encryption corresponding to data obtained by multiplying plaintext data as a target to be processed, by a power of a predetermined number of two or more, the at least one second processor is configured to perform acquiring the encrypted data from the data generation device, and executing a processing on the encrypted data in an encrypted state to obtain a processing result in the encrypted state, and the at least one third processor is configured to perform acquiring the processing result from the encryption processing device, and postprocessing by decrypting data of the processing result in the encrypted state and by dividing the decrypted data by the power of the predetermined number of two or more.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

Exemplary embodiment(s) of the present invention will be described in detail based on the following figures, wherein.

DETAILED DESCRIPTION

Embodiments will be described with reference to the drawings. It should be noted that the embodiments described below do not limit the invention according to the claims, and all of the elements and combinations thereof described in the embodiments are not necessarily essential to the solution to the problem.

First, a processing system according to an embodiment will be described.

Figure 1:
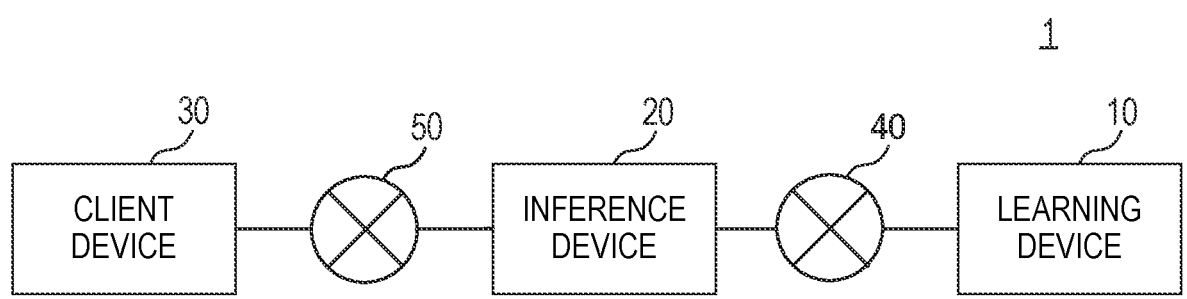
FIG. 1 is an overall configuration diagram of a processing system according to an embodiment.

FIG. 1 is an overall configuration diagram of the processing system according to the embodiment.

A processing system 1 is an example of an encryption processing system, and includes a learning device 10, an inference device 20 serving as an example of an encryption processing device, and a client device 30 serving as an example of an encryption data generation device and a processing result utilization device. The learning device 10 and the inference device 20 are connected via a network 40. The inference device 20 and the client device 30 are connected via a network 50. The networks 40, 50 are, for example, local area networks (LAN) or wide area networks (WAN). Although the network 40 and the network 50 are different networks in FIG. 1, the networks may also be the same network.

The learning device 10 learns a neural network model. The inference device 20 sets the neural network model based on a learning result of the neural network model learned by the learning device 10 (setting values of coefficients (weight or bias) of the neural network model, and the like) and performs an inference processing. The client device 30 is, for example, a device used by a user, and executes a preprocessing, such as encrypting, on data to be subjected to the inference processing (target data). Then the client device 30 transmits the preprocessed data to the inference device 20. The client device 30 receives a result of the inference processing (inference result) performed by the inference device 20, executes a post-processing on the encrypted inference result, and obtains a final inference result.

Figure 2:
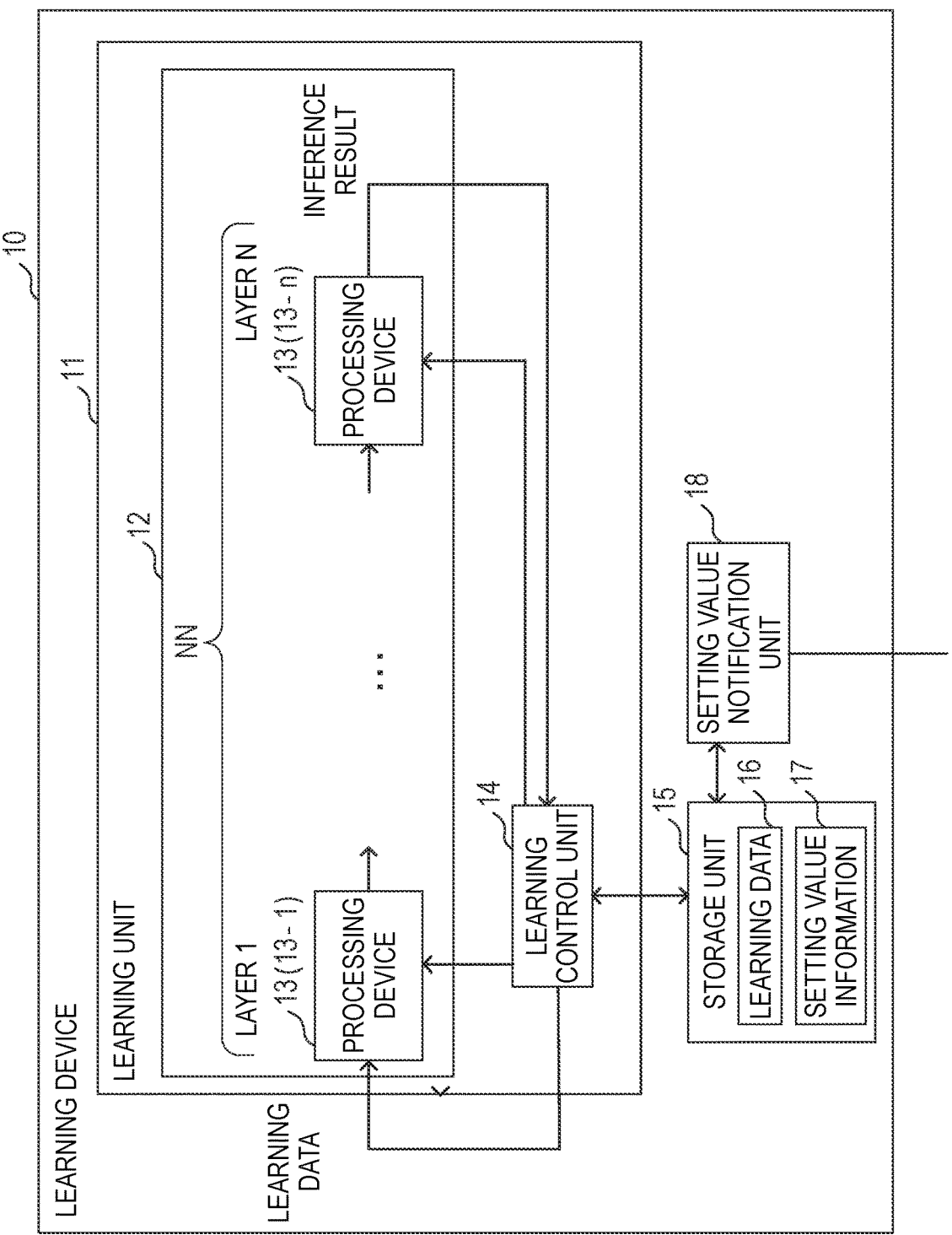
FIG. 2 is a functional configuration diagram of a learning device according to the embodiment.

FIG. 2 is a functional configuration diagram of a learning device according to a first embodiment.

The learning device 10 includes a learning unit 11, a storage unit 15, and a setting value notification unit 18.

The learning unit 11 includes a neural network model 12 and a learning control unit 14.

The neural network model 12 is, for example, a neural network model configured to execute a predetermined inference processing and output an inference result thereof. The neural network model 12 is configured by one or more processing layers (layers). In the present embodiment, the neural network model 12 is used for learning a setting value. In the example of FIG. 2, the neural network model 12 is configured by layers 1 to N. Here, N is an integer of 1 or more. A processing in each layer is executed by each processing unit 13. The processing in each layer is an example of a partial processing. The neural network model 12 may be, for example, a model that executes the inference processing to infer what an image data to be processed represents, for example, what is included therein, such as a person, a dog, or a cat, and outputs the inference result. The number of layers in the neural network model 12 and types and contents of the partial processing executed in each layer may be set optionally.

Examples of the processing unit 13 constituting the layer of the neural network model 12 include a convolution processing unit, an activation function unit, a pooling processing unit, an affine processing unit, a SoftMax processing unit, and the like. The convolution processing unit executes a convolution processing using each of a plurality of pieces of filter data (an example of the setting value). The activation function unit executes a processing of converting input data by an activation function. The pooling processing unit executes a processing of down-sampling the input data. The affine processing unit executes an affine transformation processing on the input data. The SoftMax processing unit executes a processing by a soft max function on the input data.

The learning control unit 14 receives the learning data 16 stored in the storage unit 15 and inputs it to the neural network model 12. The learning control unit 14 learns the setting value in the neural network model 12 based on inference results input to the neural network model 12 and output from the neural network model 12. When learning of learning data 16 is finished, the learning control unit 14 stores setting value information 17 related to the setting value obtained by the learning in the storage unit 15.

The storage unit 15 stores the learning data 16 used for the learning unit 11 to learn the neural network model 12 and the setting value information 17, which is information related to setting values of coefficients and the like of the neural network model 12. The learning data 16 may be stored in the storage unit 15 as teacher data associated with inference result data corresponding to the learning data 16. The learning data 16 may be, for example, unencrypted data (plaintext data). The setting value included in the setting value information 17 includes, for example, a filter coefficient used in the convolution processing unit, a weight used in the affine processing unit, and the like, and such values are used as multipliers, for example, in multiplication of the processing unit.

The setting value notification unit 18 transmits the setting value information 17 stored in the storage unit 15 to the inference device 20.

Next, the inference device 20 will be described in detail.

Figure 3:
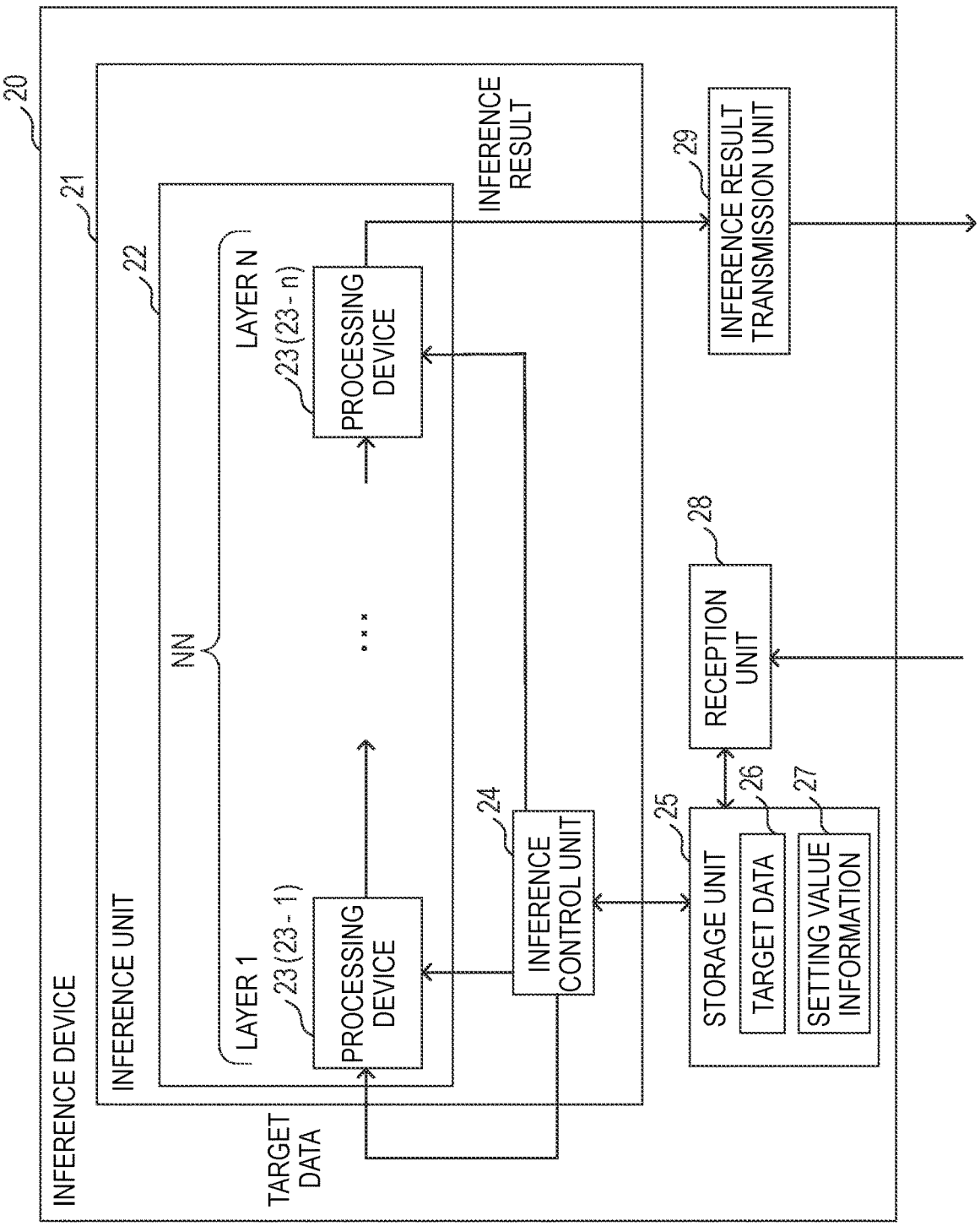
FIG. 3 is a functional configuration diagram of an inference device according to the embodiment.

FIG. 3 is a functional configuration diagram of the inference device according to the embodiment.

The inference device 20 includes an inference unit 21 serving as an example of a processing execution unit, a storage unit 25, a reception unit 28 serving as an example of a first acquisition unit, and an inference result transmission unit 29.

The inference unit 21 includes a neural network model 22 and an inference control unit 24.

The neural network model 22 is, for example, a neural network model configured to input encryption data which is encrypted by homomorphic encryption, execute a predetermined inference processing and output an inference result thereof. The homomorphic encryption is, for example, Paillier encryption or lifted-ElGamal encryption.

The neural network model 22 is constituted by one or more processing layers (layers). In the present embodiment, the neural network model 22 is configured to execute processing corresponding to the neural network model 12 of the learning device 10 on encrypted data. In the present embodiment, for example, each processing unit 23 of the neural network 22 corresponds to each processing unit 13 of the neural network 12. In the example of FIG. 3, the neural network model 22 is configured by layers 1 to N. A processing in each layer (partial processing) is executed by each processing unit 23. The neural network model 22 may be, for example, a model that executes the inference processing to infer what an image data to be processed represents, for example, what is included therein, such as a person, a dog, or a cat, and outputs the inference result. The number of layers in the neural network model 22 and types and contents of the partial processing executed in each layer may be set optionally.

Examples of the processing unit 23 constituting the layer of the neural network model 22 include a convolution processing unit, an activation function unit, a pooling processing unit, an affine processing unit, a SoftMax processing unit, and the like.

The inference control unit 24 sets the neural network model 22 based on the setting value information 27 stored in the storage unit 25, that is, sets coefficients and the like in the processing unit 23 of the processing layer. In the present embodiment, the inference control unit 24 sets an adjustment multiplication value for the processing unit 23 corresponding to the processing unit 13 of the learning device 10 that executes a non-integer multiplication processing. The adjustment multiplication value is an integer obtained by multiplying the setting value indicated by the setting value information 27 by an adjustment value (for example, a number larger than 1) determined in advance for the processing unit 23. When a result obtained by multiplying the setting value by the adjustment value is not an integer, for example, an integer close to that value may be used as the adjustment multiplication value. As a result, in the processing unit 23, a ciphertext space operation corresponding to a processing of multiplying plaintext data by the adjustment multiplication value is performed on encrypted data input from a preceding stage. That is, in the processing unit 23, an operation of multiplying a number, which is the adjustment value times larger (substantially the adjustment value times larger in a case where a value obtained by multiplying the setting value by the adjustment value is not an integer) than that of the processing unit 13, is performed. For example, in a case where encryption data input to a certain processing unit 23 is encryption data obtained by encrypting plaintext data input to the corresponding processing unit 13, when a processing result of encrypted data output from the processing unit 23 is decrypted, a value thereof is the adjustment value times larger than that of the processing result of the processing unit 13.

For example, in a case where the setting value transmitted from the learning device 10 (corresponding to the setting value obtained by the learning of the learning device 10) is floating-point format data, the inference control unit 24 converts the setting value into fixed-point format data having a predetermined number of bits. Then the inference control unit 24 may multiply the setting value converted to the fixed-point format by the adjustment value and converts a value thereof into an integer to obtain the adjustment multiplication value. At this time, the adjustment value may be a power-of-two adjustment value that may convert fixed-point format data having a predetermined number of bits into an integer. In this way, the adjustment multiplication value may be reliably converted into an integer. In a case where the setting value transmitted from the learning device 10 (corresponding to the setting value obtained by the learning of the learning device 10) is fixed-point format data, the setting value may be multiplied by the adjustment value so as to be converted into an integer and obtain the adjustment multiplication value.

Here, Paillier encryption, which is an additive homomorphic encryption, will be described as an example of the additive homomorphic encryption.

When a processing related to the encryption is performed, the following various settings are determined. That is, secure prime numbers p and q to be used in the encryption are prepared. Procedures and precautions for determining the prime numbers may be the same as that of RSA encryption. It is assumed that N=p×q. k is optionally set in a range of $1 \leq k \leq N-1$. Let $g=1+kN$. Here, p and q are secret keys, g and N are public keys and system parameters.

For example, when plaintext data is A, B ($0 \leq A \leq N-1$, $0 \leq B \leq N-1$), encrypted data eA, eB obtained by performing encryption respectively are expressed as shown in the following equations (1) and (2):

$$e_A = g^A \times r_1^N \bmod N^2 \qquad (1)$$

$$e_B = g^B \times r_2^N \bmod N^2 \qquad (2)$$

Here, r1 ($0 \leq r1 \leq N-1$) and r2 ($0 \leq r2 \leq N-1$) are random numbers.

An operation corresponding to a sum operation between encrypted data of the Paillier encryption and the plaintext data may be executed as multiplication of the encrypted data.

The multiplication of the encrypted data, that is, eA×eB, is as shown in equation (3):

$$e_A \times e_B = g^A \times g^B \times r_1^N \times r_2^N \bmod N^2 \qquad (3)$$
$$= g^{A+B} \times r_1^N \times r_2^N \bmod N^2.$$

Here, since $g=(1+kN)$, $g^N=(1+kN)^N$ can be obtained by substituting $(1+kN)$ into g of $g^N$. When $(1+kN)^N$ is expanded by the binomial theorem, $(1+kN)^N=1+kN^2+\ldots$. Since second and subsequent terms of the expression $1+kN^2+\ldots$ after the expansion are all multiples of $N^2$, a result of dividing $1+kN^2+\ldots$ by $N^2$ is 1. Therefore, $g^N \bmod N^2 = 1$. Since $g^N \bmod N^2 = 1$, $g^{(A+B)} = g^{(A+B \bmod N)}$ is established. Then equation (3) may be transformed into the following equation using the relationship of:

$$g^{(A+B)} = g^{(A+B \bmod N)}. \qquad (4)$$

$$\text{Equation (3)} = g^{(A+B \bmod N)} \times r_1^N \times r_2^N \bmod N^2$$
$$= g^{(A+B \bmod N)} \times (r_1 \times r_2)^N \bmod N^2$$

If $r_3 = r_1 \times r_2 \bmod N$, since $r_1$ and $r_2$ are all random numbers, $r_3$ is also a random number. Therefore, equation (4) may be transformed as shown in the following equation (5).

$$\text{Equation (4)} = g^{(A+B \bmod N)} \times r_3^N \bmod N^2 \qquad (5)$$
$$= e(A+B \bmod N)$$

e(A+B mod N) shown in equation (5) becomes A+B mod N when decrypted. Therefore, if A and B are sufficiently smaller than N, the expression can be substantially regarded as A+B, so that the multiplication of the encrypted data corresponds to the sum operation of the plaintext data.

An operation corresponding to multiplication of the plaintext data and an integer of the plaintext data can be executed on the encrypted data of the Paillier encryption.

A×C, which is a multiplication of plaintext data A and integer C, corresponds to a sum operation of adding A for C times. Therefore, by performing encrypted data multiplication for each of the sum operations, an operation can be executed on the encrypted data corresponding to the multiplication of the plaintext data A and the integer C.

Specifically, $e_A \times e_A \times \ldots$, that is, only a power of the encrypted data (power of the integer C) needs to be calculated, as shown in equation (6).

$$e_A \times e_A \times \ldots = e_{A+A+\ldots} = e_{AC} \qquad (6)$$

The $e_{AC}$ shown in equation (6) becomes AC when decrypted, which is a result of the multiplication of the plaintext data A and the integer C. Therefore, it may be seen that an operation of raising the same encrypted data of Paillier encryption is an operation corresponding to the multiplication of the plaintext data and the integer of the plaintext data.

The inference control unit 24 inputs target data 26, which is data to be processed, to the neural network model 22, and causes the neural network model 22 to execute the inference processing. In the present embodiment, the target data 26 is encrypted data encrypted by homomorphic encryption.

The storage unit 25 stores the target data 26, which is a target to be subjected to the inference processing in the neural network model 22 of the inference unit 21, and the setting value information 27, which is information related to setting values of coefficients and the like of the neural network model 22. The setting value included in the setting value information 27 is the learning result of the learning device 10, and includes, for example, a coefficient or weight of a filter used as a multiplier in the processing unit 23, or the like. When the inference device 20 executes the inference processing, the inference device 20 may acquire the setting value information 27 from the learning device 10, store the setting value information in the storage unit 25, and use the setting value information for the inference processing. The inference device 20 may also store the setting value information 27 learned by the learning device 10 in the storage unit 25 in advance, and then read and use the setting value information 27 from the storage unit 25 when the inference processing is executed. Further, the inference device 20 may also read the setting value information 27 learned by the learning device 10 from a recording medium 111 which will be described below, and store the read setting value information 27 in the storage unit 25.

The reception unit 28 receives the setting value information transmitted from the learning device 10 and stores the received setting value information in the storage unit 25. The reception unit 28 receives the encrypted target data 26 transmitted from the client device 30 and stores the received target data 26 in the storage unit 25.

The inference result transmission unit 29 transmits a result of the inference processing performed by the neural network model 22 of the inference unit 21, that is, the inference result which is the encrypted data, to the client device 30.

Next, the client device 30 will be described in detail.

Figure 4:
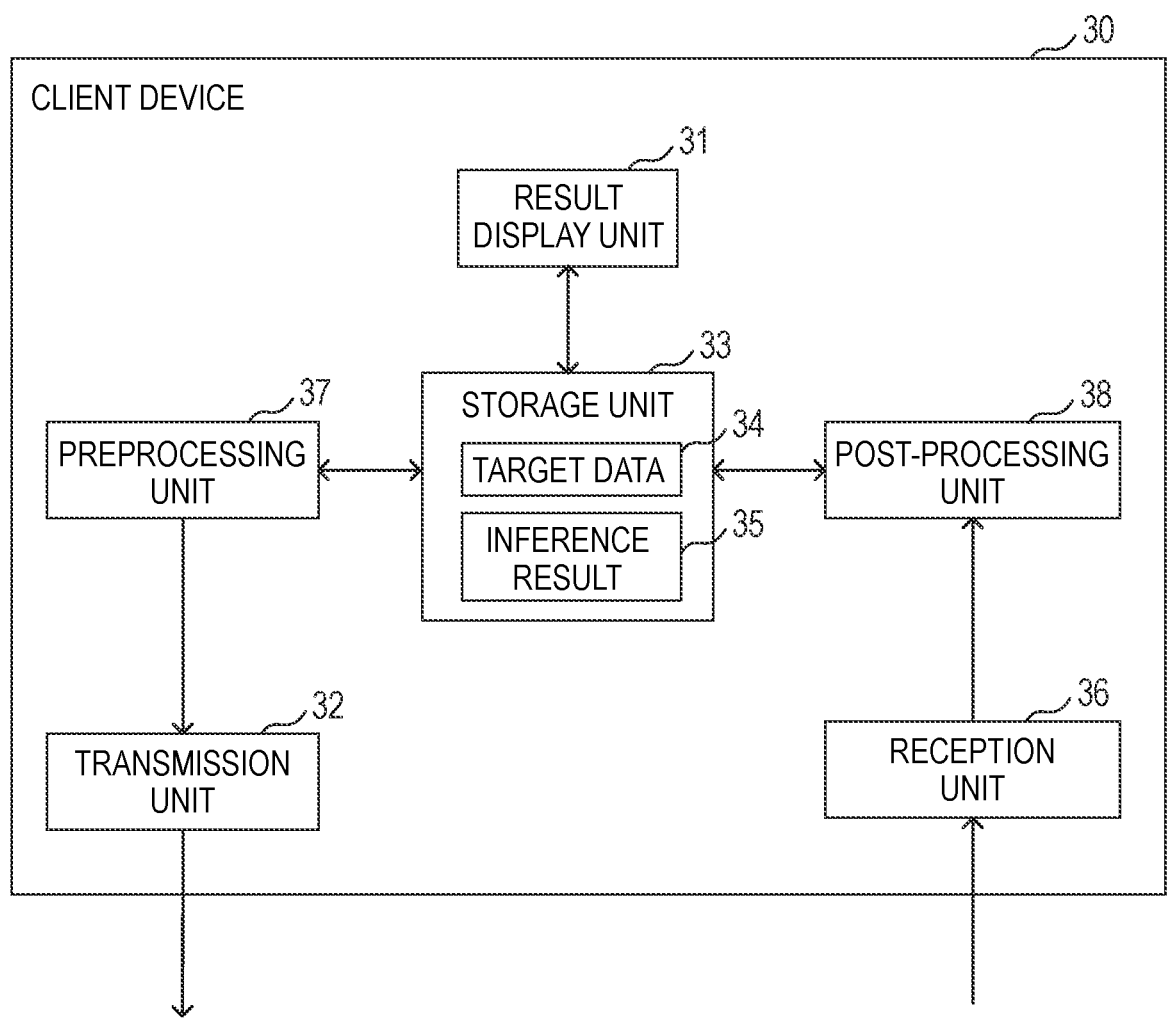
FIG. 4 is a functional configuration diagram of a client device according to the embodiment.

FIG. 4 is a functional configuration diagram of the client device according to the embodiment.

The client device 30 includes a result display unit 31, a transmission unit 32, a storage unit 33, a reception unit 36 serving as an example of a second acquisition unit, a preprocessing unit 37, and a post-processing unit 38.

The storage unit 33 stores target data 34, which is plaintext data for executing an inference processing, and an inference result 35 of the inference processing. The inference result 35 is stored when the inference result is transmitted from the inference device 20 and a predetermined processing is performed, and there is no inference result for the target data 34 which has not been subjected to the inference processing of the inference device 20.

The preprocessing unit 37 performs a predetermined preprocessing on the target data 34 which is stored in the storage unit 33 and has not been encrypted. Specifically, the preprocessing unit 37 executes a preprocessing of generating encrypted data of homomorphic encryption (for example, Paillier encryption) corresponding to plaintext data obtained by multiplying the target data 34 by a predetermined power of 2 and dividing the same by a cumulative adjustment value included in the processing executed by the inference device 20. Here, accumulation of the adjustment value used in the processing executed in the inference device 20 is, for example, a value obtained by multiplying all adjustment values used for cumulative multiplication (cumulative adjustment value) when the adjustment values are multiplied cumulatively in the processing. According to this preprocessing, when a subsequent inference processing is executed, components of adjustment performed by the adjustment values are removed from an inference result thereof. Since the accumulation of the adjustment value of the inference processing of the inference device 20 is specified by the configuration of the inference device 20, the accumulation of the adjustment value may be set in advance in the preprocessing unit 37 or may be acquired from the inference device 20 before the processing and set in the preprocessing unit 37. The preprocessing unit 37 passes the generated encrypted data to the transmission unit 32.

The transmission unit 32 transmits the encrypted data passed from the preprocessing unit 37 to the inference device 20 as the target data of the inference processing. The reception unit 36 receives the inference result of the inference processing from the inference device 20 and passes the inference result to the post-processing unit 38.

The post-processing unit 38 receives the inference result passed from the reception unit 36 and executes a predetermined post-processing on the inference result. Specifically, the post-processing unit 38 performs decrypting corresponding to an encryption method of the preprocessing unit 37, divides the decrypted inference result by a predetermined power of 2 multiplied by the preprocessing unit 37, and stores the inference result in the storage unit 33.

The result display unit 31 displays and outputs various types of information based on the inference result 35 stored in the storage unit 33. The result display unit 31 may directly display the inference result 35, or may execute a predetermined processing based on the inference result 35 and display an execution result thereof.

Next, a more specific example of the processing system 1 will be described.

Figure 5:
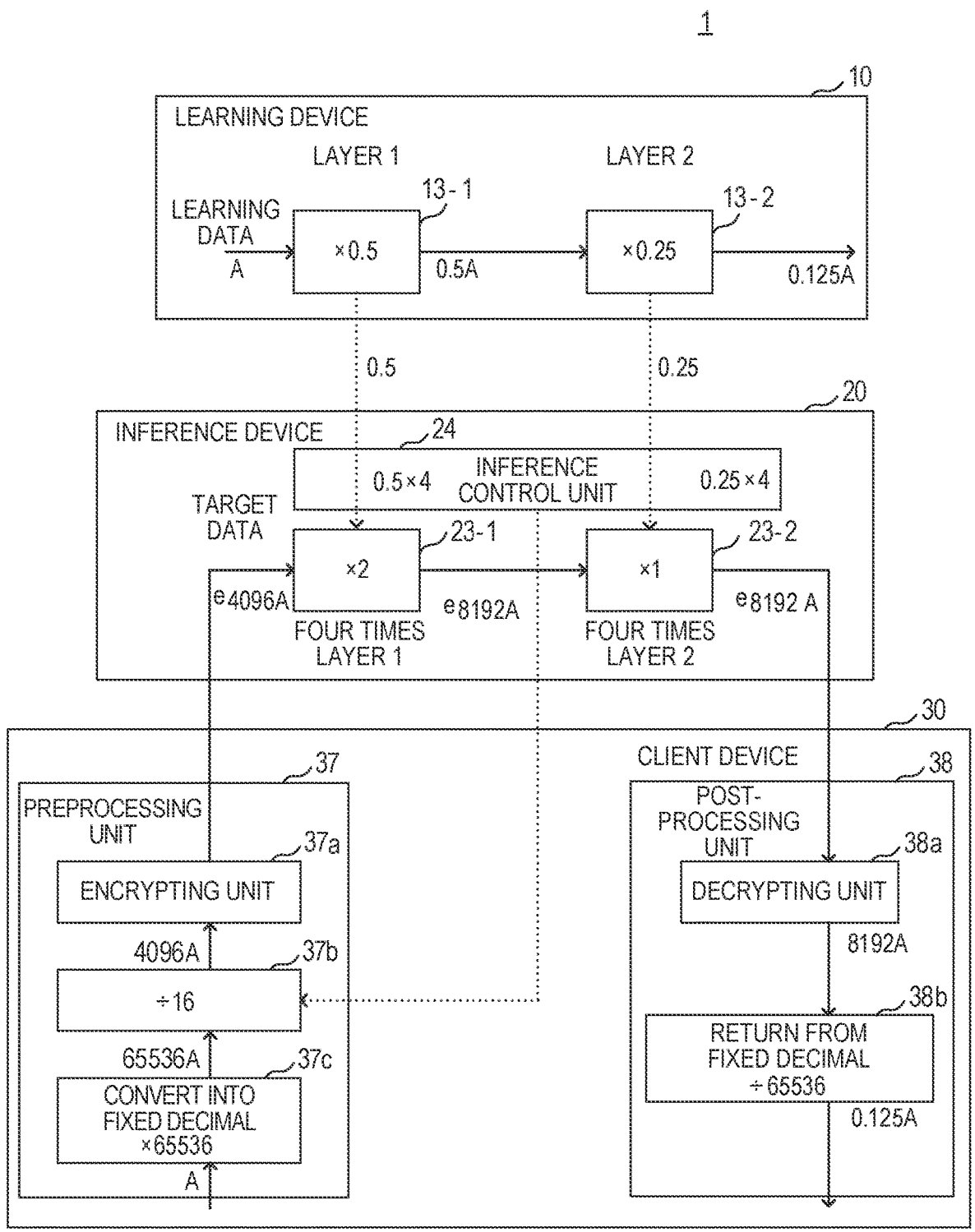
FIG. 5 is a functional configuration diagram of an example of the processing system according to the embodiment.

FIG. 5 is a functional configuration diagram of an example of the processing system according to the embodiment.

The learning device 10 includes a processing unit 13-1 constituting a processing layer 1 and a processing unit 13-2 constituting a processing layer 2.

The processing unit 13-1 performs a multiplication processing of multiplying input data by 0.5. It should be noted that 0.5 is obtained by the learning of the learning device 10 as a setting value to be used in an operation in the processing unit 13-1. For example, when the plaintext data A is input to the processing unit 13-1, A×0.5 is calculated in the processing unit 13-1, and 0.5A is output. The setting value (0.5 in this example), which is learned to be used for the learning processing unit 13-1, is transmitted to the inference device 20 by the setting value notification unit 18.

The processing unit 13-2 performs a multiplication processing of multiplying the input data by 0.25 and outputs a result thereof. It should be noted that 0.25 is obtained by the learning of the learning device 10 as a setting value to be used in an operation in the processing unit 13-2. For example, when 0.5A, which is the plaintext data output from the processing unit 13-1, is input to the processing unit 13-2, 0.5A×0.25 is calculated in the processing unit 13-2, and 0.125A is output. The setting value (0.25 in this example), which is learned to be used for the learning processing unit 13-2, is transmitted to the inference device 20 by the setting value notification unit 18.

The inference device 20 includes a processing unit 23-1 constituting the processing layer 1, a processing unit 23-2 constituting the processing layer 2, and the inference control unit 24.

The inference control unit 24 multiplies each setting value transmitted from the learning device 10 by adjustment values corresponding to each of the processing units 23-1, 23-2 to convert each setting value into an integer, so as to generate adjustment multiplication values and set the adjustment multiplication values in each of the processing units 23-1, 23-2. In the present embodiment, the adjustment value is a base of a power to be multiplied by a conversion unit 37c (2 in this example) or a value obtained by raising such a base.

In the present example, the adjustment value of the processing unit 23-1 is 4, and the adjustment value of the processing unit 23-2 is 4. In the present example, the inference adjustment unit 24 multiplies the adjustment value 0.5 used for the processing unit 23-1 transmitted from the learning device 10 by the adjustment value 4 of the processing unit 23-1 to generate the adjustment multiplication value 2, and sets the adjustment multiplication value 2 in the processing unit 23-1. The inference adjustment unit 24 multiplies the adjustment value 0.25 used for the processing unit 23-2 transmitted from the learning device 10 by the adjustment value 4 of the processing unit 23-2 to generate the adjustment multiplication value 1, and sets the adjustment multiplication value 1 in the processing unit 23-2.

The preprocessing unit 37 of the client device 30 includes the conversion unit 37c, an adjustment removal unit 37b, and an encrypting unit 37a. The conversion unit 37c converts floating-point format plaintext data to fixed-point format data by multiplying the floating-point format plaintext data by a predetermined power of 2. Here, the predetermined power of 2 may be, for example, $2^{16}$ or may be any value that has sufficient number of bits, and may be, for example, a value equal to or larger than the cumulative adjustment value of the inference processing. In the example of FIG. 5, the conversion unit 37c converts data A, which is floating-point format plaintext data, into $2^{16}$ times, that is, multiplying the data A by 65536 to convert the data A into 65536A.

In order to eliminate an influence of the cumulative adjustment value of the inference device 20, the adjustment removal unit 37b performs a processing of removing a multiple corresponding to the cumulative adjustment value from the target data in advance, that is, a processing of dividing the cumulative adjustment value. In the present embodiment, the adjustment removal unit 37b divides the fixed-point format plaintext data, which is converted by the conversion unit 37c, by the cumulative adjustment value. In the example of FIG. 5, the data 65536A is divided by a cumulative adjustment value 16 obtained by multiplying the adjustment value 4 of the processing unit 23-1 and the adjustment value 4 of the processing unit 23-2, so as to obtain 4096A. The cumulative adjustment value may be received by the adjustment removal unit 37b from the inference control unit 24 and thus set, or a user of the client device 30 may acquire and set the cumulative adjustment value.

The encrypting unit 37a encrypts the plaintext data by additive homomorphic encryption, for example, Paillier encryption. In the example of FIG. 5, the plaintext data 4096A is encrypted into encrypted data $e_{4096A}$. Here, $e_{4096A}$ indicates a value obtained by encrypting the plaintext data 4096A.

In this way, the target data encrypted by performing the preprocessing in the preprocessing unit 37 is transmitted to the inference device 20. The processing unit 23-1 performs a ciphertext space operation (corresponding operation) on the input encrypted data, the ciphertext space operation corresponding to the processing of multiplying the plaintext data by the set adjustment multiplication value (2 in the same figure). For example, in a case where Paillier encryption is used, the processing unit 23-1 performs an operation of raising the input encrypted data by the adjustment multiplication value as the corresponding operation. In the present example, the processing unit 23-1 calculates and outputs $e_{8192A}$ upon raising the input encrypted data $e_{4096A}$ by the adjustment multiplication value (here, to be squared). When $e_{8192A}$ is decrypted, plaintext data 8192A is obtained. Therefore, an output result of the processing unit 23-1 is the encrypted data $e_{8192A}$, which is a value of a multiple (here, 16384 times) obtained by multiplying the output result 0.5A of the processing unit 13-1 by the adjustment value (four times), by the power of 2 multiplied by the preprocessing unit 37 ($2^{16}$ times: 65536 times) and by removal adjustment of the cumulative adjustment value ($1/16$).

The processing unit 23-2 performs a ciphertext space operation (corresponding operation) on the input encrypted data, the ciphertext space operation corresponding to the processing of multiplying the plaintext data by the set adjustment multiplication value (1 in the same figure). For example, in the case where Paillier encryption is used, the processing unit 23-2 performs an operation of raising the input encrypted data by the adjustment multiplication value as the corresponding operation. In the present example, the processing unit 23-2 calculates and outputs $e_{8192A}$ upon raising the input encrypted data $e_{8192A}$ by the adjustment multiplication value (multiplied by 1). When $e_{8192A}$ is decrypted, plaintext data 8192A is obtained. Therefore, an output result of the processing unit 23-2 is encrypted data, which is a value of a multiple (here, 65536 times) obtained by multiplying the output result 0.125A of the processing unit 13-2 by the adjustment value of the processing unit 23-1 (4), by the adjustment value of the processing unit 23-2 (4), by the power of 2 multiplied by the preprocessing unit 37 ($2^{16}$ times: 65536 times) and by adjustment of the cumulative adjustment value ($1/16$). Here, the output result of the processing unit 23-2 is the value of the multiple obtained by multiplying the output result 0.125A of the processing unit 13-2 only by the power of 2 multiplied by the preprocessing unit 37 ($2^{16}$ times: 65536 times) and is a value in which an influence of the accumulation of the adjustment value is eliminated. A processing result of the processing unit 23-2 is transmitted to the client device 30 by the inference result transmission unit 29.

The post-processing unit 38 of the client device 30 includes a decrypting unit 38a and a conversion unit 38b. The decrypting unit 38a acquires an inference result, which is the encrypted data transmitted from the inference device 20, performs decrypting corresponding to the encryption method of the encrypted data, and passes a plaintext data inference result to the conversion unit 38b. For example, in the present example, the decrypting unit 38a decrypts $e_{8192A}$, obtains plaintext data 8192A, and passes 8192A to the conversion unit 38b.

The conversion unit 38b performs inverse conversion of the conversion unit 37c of the preprocessing unit 37. That is, the conversion unit 38b divides fixed-point format plaintext data by a predetermined power of 2, thereby converting the plaintext data into floating-point format plaintext data. In the example of FIG. 5, the conversion unit 38b divides the fixed-point format plaintext data 8192A by $2^{16}$, thereby converting the data 8192A to 0.125A. As a result, the client device 30 may obtain the same value as an execution result obtained by executing the processings of the processing units 13-1, 13-2 of the learning device 10 on the plaintext data.

As described above, in the processing system 1, the inference device 20 can perform the processing in a confidential state by using the encrypted data, and the client device 30 may obtain the same result as the result of processing the plaintext data.

Next, a processing operation of the processing system 1 according to one embodiment will be described.

Figure 6:
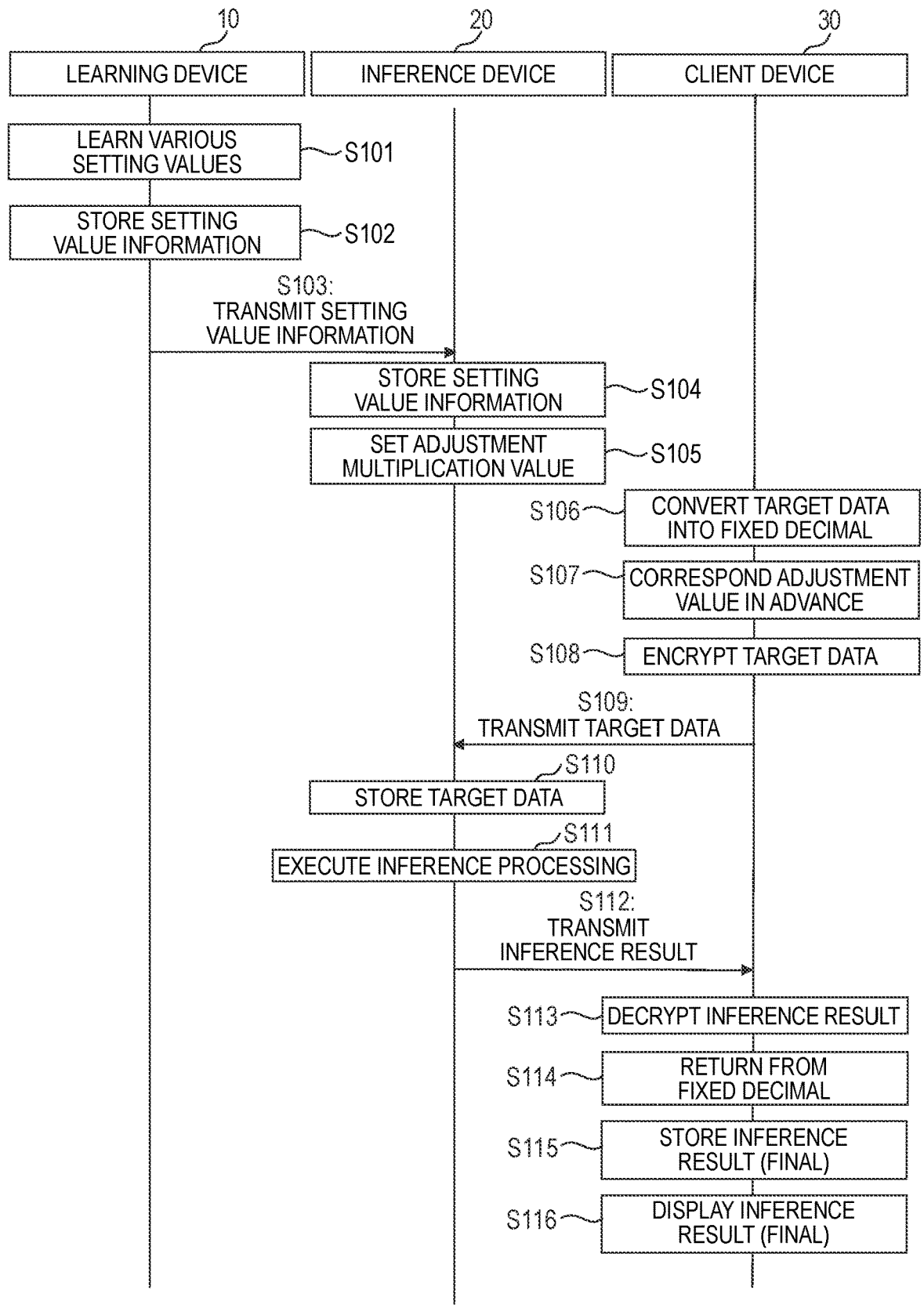
FIG. 6 is a sequence diagram showing an operation of the processing system according to the embodiment.

FIG. 6 is a sequence diagram showing the operation of the processing system according to the embodiment.

The learning control unit 14 of the learning device 10 uses the learning data 16 stored in the storage unit 15 to cause the neural network model 12 of the learning unit 11 to execute the inference processing, thereby performing learning of various setting values in the processing unit 13 of the neural network model 12 (S101). Next, the learning control unit 14 stores setting value information related to the setting values obtained by the learning in the storage unit 15 (S102).

Next, the setting value notification unit 18 reads the setting value information 17 stored in the storage unit 15 and transmits the read setting value information 17 to the inference device 20 (S103).

The reception unit 28 of the inference device 20 receives the setting value information 17 transmitted from the learning device 10 and stores the received setting value information 17 in the storage unit 25 (S104). Next, the inference control unit 24 of the inference device 20 acquires the setting value information 27 from the storage unit 25, multiplies the setting values in the setting value information 27 for each processing unit 23 by the adjustment values corresponding to each processing unit 23 to convert each setting value into an integer, so as to generate the adjustment multiplication values and set the adjustment multiplication values in each processing unit 23 (S105).

Meanwhile, the conversion unit 37c of the client device 30 acquires the target data 34 from the storage unit 33, and converts the target data into a fixed decimal value format (S106). Next, the adjustment removal unit 37b performs a processing of dividing the fixed decimal value format target data by a multiple corresponding to the cumulative adjustment value (S107). Next, the encryption unit 37a encrypts the target data obtained by the adjustment removal unit 37b by predetermined encryption and passes the encrypted data to the transmission unit 32 (S108). The transmission unit 32 transmits the encrypted target data to the inference device 20 (S109).

The reception unit 28 of the inference device 20 receives the target data serving as an inference target from the client device 30 and stores the target data in the storage unit 25 (S110).

Next, the inference control unit 24 reads the target data 26, which is encrypted data, from the storage unit 25, and inputs the target data 26 to the processing unit 23 of a first processing layer (layer 1) of the neural network model 22. As a result, in the neural network model 22, the inference processing is executed on the target data 26, and an inference result is output from the processing unit 23 of a final processing layer (layer N) to the inference result transmission unit 29 (S111).

Next, the inference result transmission unit 29 of the inference device 20 transmits the inference result passed from the neural network model 22 to the client device 30 that has requested the inference processing of the target data (S112).

The reception unit 36 of the client device 30 receives the inference result from the inference device 20, passes the inference result to the post-processing unit 38. The decrypting unit 38a of the post-processing unit 38 decrypts the inference result and passes the decrypted inference result to the conversion unit 38b (S113). The conversion unit 38b generates a final inference result (inference result (final)) by executing an inverse conversion of a conversion processing of the conversion unit 37c on the decrypted inference result, that is, a processing of returning the inference result from the fixed decimal value format to the floating-point format data (S114), and stores the generated inference result (final) 35 in the storage unit 33 (S115). Thereafter, the result display unit 31 displays and outputs the inference result based on the inference result 35 stored in the storage unit 33 (S116).

As described above, according to the processing system 1 according to the present embodiment, the inference result may be obtained without any problem even when the target data is in the floating-point format. Even when a non-integer multiplication processing is necessary for the plaintext data, the inference device 20 only needs to execute a processing, which corresponds to an integer multiplication processing for the plaintext data, on the encrypted data. Therefore, the inference device 20 may perform the processing including the non-integer multiplication processing for the plaintext while maintaining the confidential state by the encrypted data. As a result, information may be appropriately prevented from leaking from the inference device 20.

The learning device 10, the inference device 20, and the client device 30 may be configured by computer devices.

Figure 7:
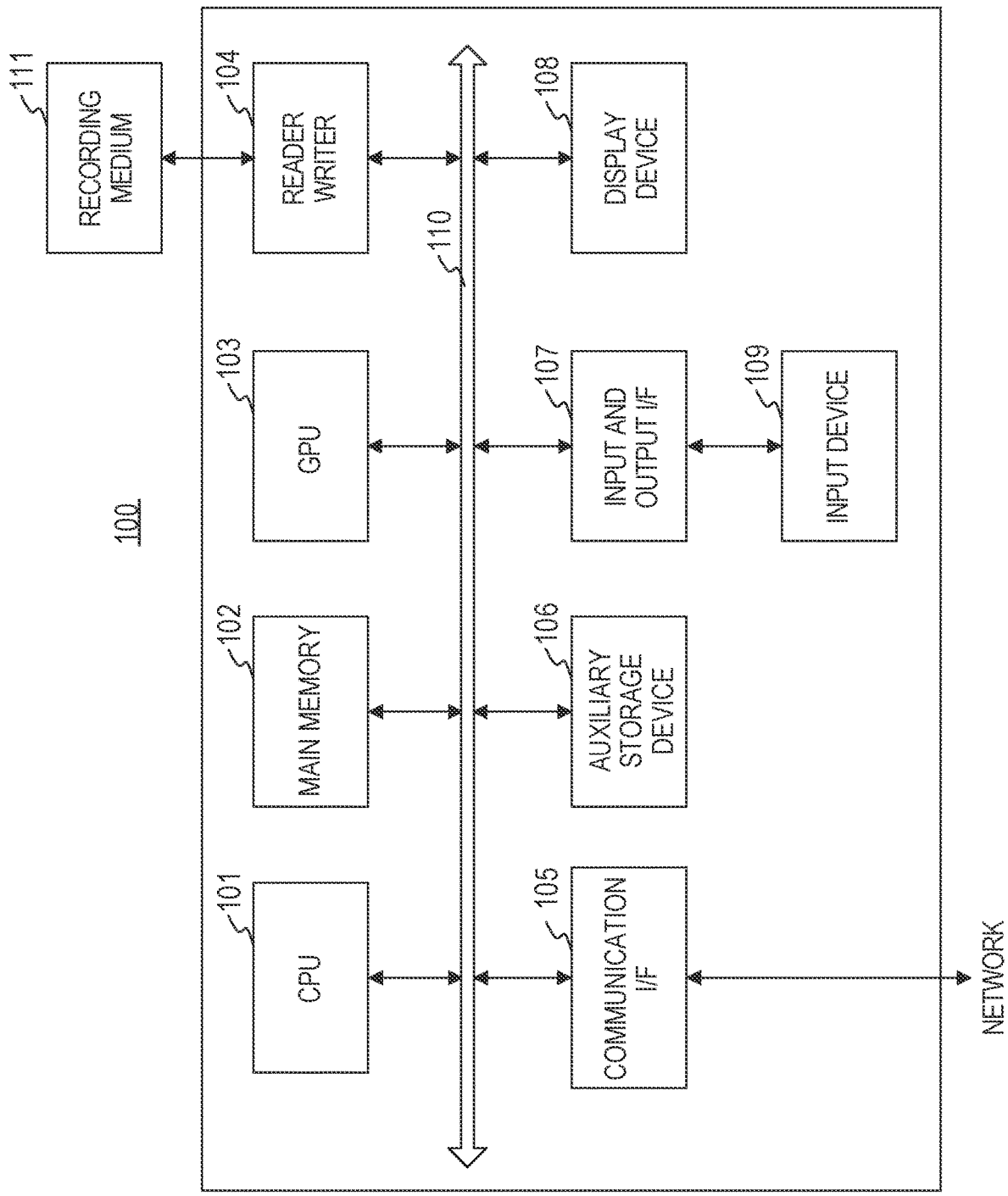
FIG. 7 is a configuration diagram of a computer device according to the embodiment.

FIG. 7 is a block diagram showing one embodiment of the computer device. Although the learning device 10, the inference device 20, and the client device 30 are configured by different computer devices in the present embodiment, the computer devices may also have the same configuration. In the following description, the computer devices constituting the learning device 10, the inference device 20, and the client device 30 will be described using the computer device shown in FIG. 7 for the sake of convenience.

A computer device 100 includes, for example, a central processing unit (CPU) 101, a main memory 102, a graphics processing unit (GPU) 103, a reader writer 104, a communication interface (communication I/F) 107, an auxiliary storage device 106, an input and output interface (input and output I/F) 107, a display device 108, and an input device 109. The CPU 101, the main memory 102, the GPU 103, the reader writer 104, the communication I/F 105, the auxiliary storage device 106, the input and output I/F 107, and the display device 108 are connected via a bus 110. The learning device 10, the inference device 20, and the client device 30 are configured by appropriately selecting a part or all of constituent elements described in the computer device 100.

At least one of the main memory 102 or the auxiliary storage device 106 functions as the storage unit 15 of the learning device 10, the storage unit 25 of the inference device 20, and the storage unit 33 of the client device 30.

The CPU 101 of the computer device 100 constituting the learning device 10 performs overall control of the entire learning device 10. The CPU 101 reads a program stored in the auxiliary storage device 106 into the main memory 102 and executes the program, thereby executing various processings. In the learning device 10, the CPU 101 configures the neural network model 12 of the learning unit 11, for example, by executing a processing program stored in the auxiliary storage device 106. In the computer device 100 constituting the inference device 20, the CPU 101 configures the neural network model 22 of the inference unit 21, for example, by executing a processing program stored in the auxiliary storage device 106. In the computer device 100 constituting the client device 30, the CPU 101 configures the result display unit 31, the preprocessing unit 37 and the post-processing unit 38, for example, by executing a processing program stored in the auxiliary storage device 106. The CPU 101 of the computer device 100 constituting the inference device 20 may have better processing performance than the CPU 101 of the computer device 100 constituting the client device 30.

The main memory 102 is, for example, a RAM, a ROM, or the like, and stores a program (a processing program and the like) to be executed by the CPU 101 and various types of information. The auxiliary storage device 106 is, for example, a non-transitory storage device (non-volatile storage device) such as a hard disk drive (HDD) or a solid state drive (SSD), and stores a program to be executed by the CPU 101 and various types of information. In the computer device 100 constituting the learning device 10, the main memory 102 stores, for example, the learning data 16 and the setting value information 17. In the computer device 100 constituting the inference device 20, the main memory 102 stores, for example, the target data 26 and the setting value information 27. In the computer device 100 constituting the client device 30, the main memory 102 stores, for example, the target data 34 and the inference result 35.

The GPU 103 is, for example, a processor suitable for executing a specific processing, such as an image processing, and is suitable for execution of processings performed in parallel, for example. In the present embodiment, the GPU 103 executes a predetermined processing in accordance with an instruction from the CPU 101. In the computer device 100 constituting the learning device 10, the GPU 103 may configure at least one processing unit 13. In the computer device 100 constituting the inference device 20, the GPU 103 may constitute at least one processing unit 23.

The reader writer 104 is attachable to and detachable from the recording medium 111, reads data from the recording medium 111, and writes data to the recording medium 111. Examples of the recording medium 111 include non-transitory recording media (non-volatile recording media) such as an SD memory card, FD (floppy disk: registered trademark), CD, DVD, BD (registered trademark) and flash memory. In the present embodiment, a processing program may be stored in the recording medium 111, and the processing program may be read and used by the reader writer 104. In the computer device 100 constituting the learning device 10, the learning data may be stored in the recording medium 111, and the learning data may be read and used by the read writer 104. In the computer device 100 constituting the client device 30, the target data may be stored in the recording medium 111, and the target data may be read by the read writer 104 and stored in the storage unit 33.

The communication I/F 105 is connected to the networks 40, 50, and transmits and receives data to and from other devices connected to the networks 40, 50. For example, the learning device 10 transmits the setting value information to the inference device 20 connected to the network 40 via the communication I/F 105. The setting value notification unit 18 of the learning device 10, the reception unit 28 and the inference result transmission unit 29 of the inference device 20, and the transmission unit 32 and the reception unit 36 of the client device 30 are configured by the communication I/F 105 and the CPU 101 of the computer device 100.

The input and output I/F 107 is connected to the input device 109, such as a mouse or a keyboard. In the computer device 100 constituting the learning device 10, the input and output I/F 107 receives an operation input by an administrator of the learning device 10 by using the input device 109. In the computer device 100 constituting the inference device 20, the input and output I/F 107 receives an operation input by an administrator of the inference device 20 by using the input device 109. Further, in the computer device 100 constituting the client device 30, the input and output I/F 107 receives an operation input by a user of the client device 30 by using the input device 109.

The display device 108 is, for example, a display device such as a liquid crystal display, and displays and outputs various types of information.

Next, a processing system 2 according to a modified embodiment will be described.

Here, although only integers of the encryption data may be added to each other in the additive homomorphic encryption, multiplication of integers of the plaintext may be performed by repeating the addition. Therefore, by multiplying an inverse element modulo an order of a cyclic group, to which the encryption data belongs, by a dividend, which is encryption data using the additive homomorphic encryption, division may be performed conditionally. A condition thereof is that the dividend, which is the encryption data, is divisible by a divisor, which is the plaintext. Since the dividend, which is the encrypted data, is encrypted, there is no way to know whether the encrypted data is divisible by the divisor. Therefore, the division cannot always be performed on the additive homomorphic encryption. However, such a fact on the other hand allows division to be performed on space of the additive homomorphic encryption by multiplication of the inverse element if the dividend may be guaranteed to be divisible. In the processing system according to the present modified embodiment, it is possible to guarantee that the dividend is divisible, thereby enabling the division to be performed on the space of the additive homomorphic encryption.

Here, the inverse element of a value (element) of a finite cyclic group to which the plaintext belongs will be described. In order to simplify the description, the inverse element will be described through using an example of a cyclic group G $\{0, 1, 2, 3, 4\}$ whose order is 5.

An inverse element with respect to a certain element means that a value obtained by multiplying the element by the inverse element is 1. In the cyclic group G, the inverse element $2^{-1}$ of 2 is $2^{-1} \equiv 3 \pmod 5$. A reason therefor is that $2 \times 3 = 2+2+2 = 1$ in the cyclic group G. Here, a ciphertext space operation of the additive homomorphic encryption for an operation of multiplying the plaintext data by the inverse element is $e(D \times 2^{-1}) = e(D \times 3) = e(D) \times e(D) \times e(D) = e(D)^3$. D represents any value of the plaintext data, and e( ) represents data obtained by encrypting the plaintext in the parentheses. Here, when D is divisible by the element (2), $e(D \times 2^{-1}) = e(D)^3 = e(D/2)$.

The inverse element with respect to the certain element may be calculated, for example, by using a known extended Euclid's algorithm.

Figure 8:
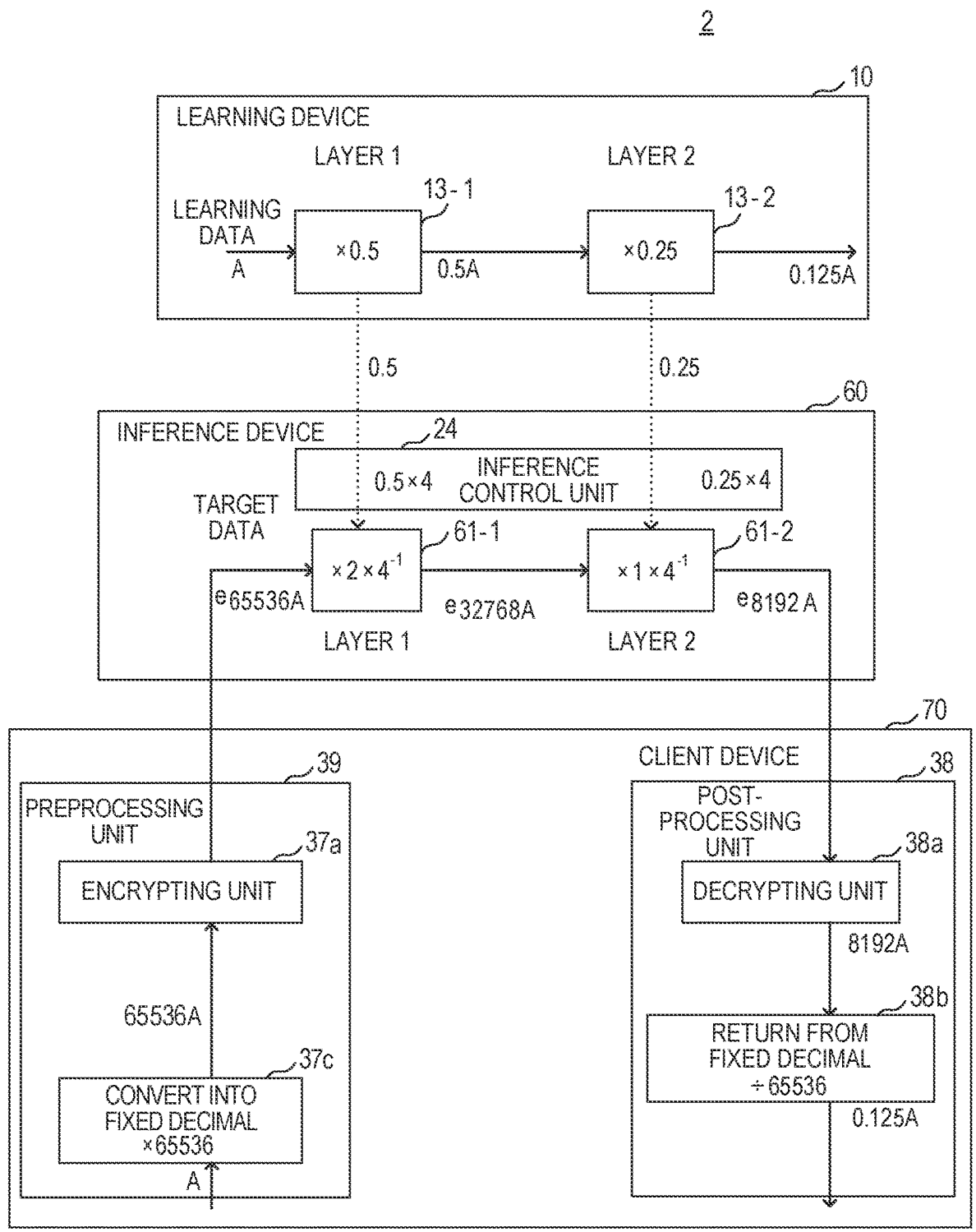
FIG. 8 is a functional configuration diagram of an example of a processing system according to a modified embodiment.

FIG. 8 is a functional configuration diagram of an example of the processing system according to the modified embodiment Portions similar to those of the processing system shown in FIG. 5 are denoted by the same reference numerals, and the description thereof may be omitted.

The processing system 2 according to the modified embodiment includes an inference device 60 instead of the inference device 20 in the processing system 1 shown in FIG. 5, and includes a client device 70 instead of the client device 30.

The client device 70 includes a preprocessing unit 39 instead of the preprocessing unit 37. The preprocessing unit 39 includes the encrypting unit 37a and the conversion unit 37c.

In the example of FIG. 8, the conversion unit 37c converts data A, which is floating-point format plaintext data, into $2^{16}$ times, that is, multiplying the data A by 65536 to convert the data A into data 65536A.

The encrypting unit 37a encrypts the plaintext data by additive homomorphic encryption, for example, Paillier encryption. In the example of FIG. 8, the encrypting unit 37a encrypts the plaintext data 65536A into encrypted data e65536A.

The inference device 60 includes a processing unit 61-1 instead of the processing unit 23-1, and includes a processing unit 61-2 instead of the processing unit 23-2. The processing unit 61-1 performs a ciphertext space operation (corresponding operation) on the input encrypted data, the ciphertext space operation corresponding to the processing of multiplying the plaintext data by the set adjustment multiplication value (2 in the same figure). Further, the processing unit 61-1 performs a ciphertext space operation on the encrypted data obtained by the operation, the ciphertext space operation corresponding to an operation of multiplying an inverse element ($4^{-1}$ in the same figure) of an adjustment value (4 in the same figure) corresponding to an adjustment multiplication value. Here, the ciphertext space operation corresponding to the processing of multiplying the inverse element is a power of an inverse element of ciphertext data (inverse power), and the same ciphertext data must be multiplied for a plurality of times. Therefore, in such an operation, for example, an amount of processing of an operation processing may be reduced by using a binary method, and processing time thereof may be shortened. In the present modified embodiment, since the conversion unit 37c of the client device 70 performs a predetermined power of 2, it is guaranteed that a value of the plaintext data is divisible by the adjustment value.

In the example of FIG. 8, the processing unit 61-1 raises the input encrypted data e65536A by the adjustment multiplication value (here, to be squared). Further, the processing unit 61-1 executes a ciphertext space operation corresponding to the operation of multiplying the obtained encrypted data by the inverse element $4^{-1}$ of the adjustment value 4, that is, the processing unit 61-1 executes the power of the inverse element $4^{-1}$ on the encrypted data. As a result, the processing unit 61-1 outputs the encrypted data $e_{32768A}$ corresponding to plaintext 32768A obtained by multiplying the plaintext 65536A by the adjustment value and the inverse element. Therefore, an output result of the processing unit 61-1 is the encrypted data, which is a value obtained by multiplying the output result 0.5A of the processing unit 13-1 by the power of 2 multiplied by the preprocessing unit 37 ($2^{16}$ times: 65536 times).

The processing unit 61-2 performs a ciphertext space operation (corresponding operation) on the input encrypted data, the ciphertext space operation corresponding to the processing of multiplying the plaintext data by the set adjustment multiplication value (1 in the same figure). Further, the processing unit 61-2 executes a ciphertext space operation on the encrypted data obtained by the operation, the ciphertext space operation corresponding to the operation of multiplying the inverse element ($4^{-1}$ in the same figure) of the adjustment value (4 in the same figure) corresponding to the adjustment multiplication value. In the present modified embodiment, since the conversion unit 37c of the client device 70 performs the predetermined power of 2, it is guaranteed that the value of the plaintext data is divisible by the adjustment value.

In the example of FIG. 8, the processing unit 61-2 raises the input encrypted data $e_{32768A}$ by the adjustment multiplication value (here, multiplied by 1). Further, the processing unit 61-2 executes a cipher space operation corresponding to the multiplication of multiplying the obtained encrypted data by the inverse element $4^{-1}$ of the adjustment value 4. That is, the processing unit 61-2 executes the power of the inverse element $4^{-1}$ on the encrypted data. As a result, the processing unit 61-2 outputs the encrypted data $e_{8192A}$ corresponding to plaintext 8192A obtained by multiplying the plaintext 32768A by the adjustment value and the inverse element. Therefore, an output result of the processing unit 61-2 is the encrypted data, which is a value obtained by multiplying the output result 0.125A of the processing unit 13-1 by the power of 2 multiplied by the preprocessing unit 37 ($2^{16}$ times: 65536 times). As a result, the encrypted data, which is a value obtained by multiplying the power of 2 multiplied by the preprocessing unit 37 ($2^{16}$ times: 65536 times), is transmitted to the client device 70.

According to the processing system 2, since the client device 70 does not need to perform the processing of eliminating the influence of the adjustment value used in the inference device 60, there is no need to change the processing according to the adjustment value in the inference device 60, and a common configuration may thus be used.

The present invention is not limited to the above-described embodiments, and may be appropriately modified and implemented without departing from the spirit of the present invention.

For example, in the above embodiment, as for the processings of the pre-processing unit 37, the conversion processing is performed by the conversion unit 37c, then the adjustment value is corrected by the adjustment removal unit 37b, and then the encryption of the encrypting unit 37a is performed. However, the present invention is not limited thereto, and an order of such processings may be changed. However, it may be necessary to change contents of specific processings to be actually performed in accordance with the order of execution to generate the same target data. For example, the encryption processing of the encrypting unit may be executed before the processing of the adjustment removal unit, and in this case, the adjustment removal unit needs to perform the ciphertext space operation corresponding to the processing of multiplying the plaintext corresponding to the processing result of the encrypting unit by the inverse element of the cumulative adjustment value. For example, when the preprocessing unit 37 generates the same target data as the example shown in FIG. 5, the adjustment removal unit may perform the ciphertext space operation corresponding to the processing of multiplying $16^{-1}$. For example, in a case where the target data is an integer, for example, the encryption of the encrypting unit may be performed, and thereafter the conversion processing of the conversion unit may be performed.

In the above embodiment, for example, if the data input to the preprocessing unit 37 is an integer and is guaranteed to be divisible by the cumulative adjustment value, the conversion unit 37c may not be provided.

In the above modified embodiment, in each layer, the ciphertext space operation, which corresponds to the operation of multiplying the inverse element for removing the adjustment value, is executed. The present invention is not limited thereto, and the ciphertext space processing corresponding to the operation of multiplying the inverse element for removing the adjustment value may be executed in another layer. In a case where the layer of the processing including the adjustment value and the layer of the operation corresponding to the operation of multiplying the inverse element for removing the adjustment value (removal layer) are different layers, correspondence therebetween may be known. For example, the removal layer may be a layer following the processing including the adjustment value. In this way, when the processing of the inference device 60 is modified or changed, a layer to be changed may be easily grasped. In the inference device 60, if all the influence of the cumulative adjustment value in the processing of the inference device 60 may be eliminated, the processing corresponding to the processing of multiplying the inverse element corresponding to the cumulative adjustment value may be executed once, or a ciphertext space processing corresponding to a processing of separately multiplying inverse elements of a plurality of values obtained by decomposing the cumulative adjustment value may be executed. A ciphertext space processing corresponding to a processing of collectively multiplying a plurality of inverse elements corresponding to adjustment values of a plurality of partial processings may also be executed. The ciphertext space processing corresponding to the multiplication of the inverse element may be executed at the beginning or the end of the processing in the inference device 60.

Although the conversion unit 37c performs the multiplication by the power of 2, and the conversion unit 38b performs the division by the power of 2 in the above-described embodiment, the present invention is not limited thereto. In the present invention, for example, the conversion unit 37c may perform the multiplication by a power of a number larger than 2, and the conversion unit 38b may perform the division by the power of the number larger than 2 used in the multiplication. In short, in the present invention, the conversion unit 37c may perform the multiplication by a power of a number equal to or larger than 2, and the conversion unit 38b may perform the division by the power of the number equal to or larger than 2 used in the multiplication. Here, for example, when the ciphertext space processing corresponding to the processing of multiplying the encrypted data by the inverse element of the adjustment value is executed as in the configuration shown in FIG. 8, it is necessary to match a base of the power used by the conversion unit 37c with a base of the adjustment value. When it is not necessary to execute the ciphertext space processing corresponding to the processing of multiplying the encrypted data by the inverse element of the adjustment value as in the configuration shown in FIG. 5, the base of the power used by the conversion unit 37c and the base of the adjustment value may not be matched.

For example, although an example in which the learning device and the inference device perform the processing by using the neural network model including two processing layers (processing units) has been described in the above embodiment, the present invention is not limited thereto. The present disclosure may be similarly applied to a learning device and an inference device that perform the processing by using a neural network model including only one processing layer (processing unit) or a neural network model including three or more processing layers (processing units).

Although an example in which the present invention is applied to the inference device that executes the processing by using the neural network model is described in the above embodiment, the present invention is not limited thereto, and, for example, the present disclosure may be similarly applied to an encryption processing device that executes the processing without using the neural network model.

Although the additive homomorphic encryption is described as an example of the homomorphic encryption in the above embodiment, the present invention is not limited thereto, and fully homomorphic encryption or SomeWhat homomorphic encryption may also be used. LWE lattice encryption may be used as the SomeWhat homomorphic encryption.

In the above embodiment, at least a part of functional units configured by executing the program by the CPU 101 of the learning device 10, the inference device 20 (60), or the client device 30 (70) may be configured by other processors in each device or a hardware circuit configured to execute a specific processing. Here, the term "processor" may refer to hardware in a broad sense, and examples of the processor may include general processors such as CPU, dedicated processors such as GPU, ASIC (Application Integrated Circuit), FPGA (Field Programmable Gate Array), and programmable logic device. Here, the term "processor" is so broad that it may include one processor or plural processors in collaboration located physically apart from each other but may work cooperatively. The processing unit 13 configured by the GPU 103 of the learning device 10 may be configured by the CPU 101, or may be configured by another hardware circuit. The processing unit 23 configured by the GPU 103 of the inference device 20 (60) may be configured by the CPU 101, or may be configured by another hardware circuit.

Although the reception unit 28 is exemplified as an example of the input unit configured to receive target data in the above embodiment, the present invention is not limited thereto, and, for example, a reader writer configured to read the target data from the recording medium where the target data is stored, or a camera configured to capture image data as the target data may be used as the input unit.

Although an example in which the learning device 10 and the inference device 20 (60) are configured by different hardware is described in the above embodiment, the present invention is not limited thereto, and such devices may be configured by the same hardware.

Although the encryption data generation device and the processing result utilization device are configured by one client device 30 (70) in the above embodiment, the encryption data generation device and the processing result utilization device may be realized by different client devices.

Instead of the adjustment removal unit 37b included in the preprocessing unit 37, an adjustment removal unit 38c (not shown) may be provided between the decrypting unit 38a and the conversion unit 38b in the post-processing unit 38. In this case, the adjustment removal unit 38c performs a processing of dividing an inference result, which plaintext data decrypted by the decrypting unit 38a, by the cumulative adjustment value. The adjustment removal unit 38c may also be provided in a subsequent stage of the conversion unit 38b.

Instead of the adjustment removal unit 37b included in the preprocessing unit 37, the adjustment removal unit 38c (not shown) may be provided in a preceding stage of the decrypting unit 38a in the post-processing unit 38. In this case, the adjustment removal unit 37b executes the ciphertext space operation corresponding to the processing of multiplying the plaintext corresponding to the inference result, which is encrypted data transmitted from the inference device 20, by the inverse element of the cumulative adjustment value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:
1. An encryption processing system comprising:
an encryption data generation device comprising at least one first processor;
an encryption processing device comprising at least one second processor; and
a processing result utilization device comprising at least one third processor, wherein
the at least one first processor is configured to perform
preprocessing by generating encrypted data of homomorphic encryption corresponding to data obtained by multiplying plaintext data as a target to be processed, by a power of a predetermined number of two or more,
the at least one second processor is configured to perform
acquiring the encrypted data from the encryption data generation device, and
executing a processing on the encrypted data in an encrypted state to obtain a processing result in the encrypted state,
the at least one third processor is configured to perform
acquiring the processing result from the encryption processing device, and
postprocessing by decrypting data of the processing result in the encrypted state and by dividing the decrypted data by the power of the predetermined number of two or more,
the processing executed by the at least one second processor includes at least one partial processing of executing an operation in a ciphertext space corresponding to an operation of multiplying data corresponding to the encrypted data by a multiplier, the multiplier having been converted to an integer by multiplying a predetermined setting value by a predetermined adjustment value, and
the preprocessing performed by the at least one first processor includes generating the encrypted data of homomorphic encryption corresponding to data obtained by dividing multiplied data by accumulation of the adjustment value used in the processing executed by the at least one second processor, the multiplied data being obtained by multiplying the plaintext data as the target to be processed by the power of the predetermined number of two or more.

2. The encryption processing system according to claim 1, wherein
the preprocessing includes
converting the plaintext data as the target to be processed by multiplying the plaintext data by the power of the predetermined number of two or more,
dividing the converted data by the accumulation of the adjustment value used in the processing executed by the at least one second processor, to obtain adjustment removal data, and
encrypting the adjustment removal data to obtain the encrypted data of homomorphic encryption, and
the adjustment value is a value whose base is the predetermined number of two or more.

3. The encryption processing system according to claim 1, wherein
the preprocessing includes
converting the plaintext data as the target to be processed by multiplying the plaintext data by the power of the predetermined number of two or more,
encrypting the converted data to obtain the encrypted data of homomorphic encryption, and
executing an operation in the ciphertext space on the encrypted data, the operation corresponding to an operation of multiplying the plaintext data corresponding to the encrypted data by an inverse element corresponding to the accumulation of the adjustment value used in the processing executed by the at least one second processor.

4. An encryption processing system comprising:
an encryption data generation device comprising at least one first processor;
an encryption processing device comprising at least one second processor; and
a processing result utilization device comprising at least one third processor, wherein the at least one first processor is configured to perform
preprocessing by generating encrypted data of homomorphic encryption corresponding to data obtained by multiplying plaintext data as a target to be processed, by a power of a predetermined number of two or more,
the at least one second processor is configured to perform
acquiring the encrypted data from the encryption data generation device, and executing a processing on the encrypted data in an encrypted state to obtain a processing result in the encrypted state, and
the at least one third processor is configured to perform
acquiring the processing result from the encryption processing device, and
postprocessing by decrypting data of the processing result in the encrypted state and by dividing the decrypted data by the power of the predetermined number of two or more,
the processing executed by the at least one second processor includes at least one partial processing of executing an operation in a ciphertext space that corresponds to an operation of multiplying data corresponding to the encrypted data by a multiplier, the multiplier having been converted to an integer by multiplying a predetermined setting value by a predetermined adjustment value, and
the at least one second processor further executes an operation in the ciphertext space that corresponds to an operation of multiplying data corresponding to the encrypted data by an inverse element of a cumulative adjustment value used in the processing executed by the at least one second processor, wherein the cumulative adjustment value is obtained by multiplying all necessary adjustment values used for cumulative multiplication.

5. The encryption processing system according to claim 4, wherein
the at least one partial processing includes a plurality of partial processings, and
the operation in the ciphertext space executed by the at least one second processor corresponds to an operation of multiplying the data corresponding to the encrypted data by inverse elements each of which corresponds to the adjustment value used in each of the plurality of partial processings collectively.

6. The encryption processing system according to claim 4, wherein
the processing executed by the at least one second processor includes, the partial processing or in a processing corresponding to the partial processing, the operation in the ciphertext space that corresponds to an operation of multiplying an inverse element corresponding to an adjustment value corresponding to the partial processing.

7. A non-transitory computer readable recording medium storing an encryption processing program causing an encryption processing system including an encryption data generation device having at least one first processor, an encryption processing device having at least one second processor, and a processing result utilization device having at least one third processor to perform an encryption processing comprising:
preprocessing, with the at least one first processor, by generating encrypted data of homomorphic encryption corresponding to data obtained by multiplying plaintext data as a target to be processed, by a power of a predetermined number of two or more;
acquiring, with the at least one second processor, the encrypted data from the encryption data generation device;
executing, with the at least one second processor, a processing on the encrypted data in an encrypted state to obtain a processing result in the encrypted state;
acquiring, with the at least one third processor, the processing result from the encryption processing device; and
postprocessing, with the at least one third processor, by decrypting data of the processing result in the encrypted state and by dividing the decrypted data by the power of the predetermined number of two or more, wherein
the processing executed by the at least one second processor includes at least one partial processing of executing an operation in a ciphertext space corresponding to an operation of multiplying data corresponding to the encrypted data by a multiplier, the multiplier having been converted to an integer by multiplying a predetermined setting value by a predetermined adjustment value, and
the preprocessing performed by the at least one first processor includes generating the encrypted data of homomorphic encryption corresponding to data obtained by dividing multiplied data by accumulation of the adjustment value used in the processing executed by the at least one second processor, the multiplied data being obtained by multiplying the plaintext data as the target to be processed by the power of the predetermined number of two or more.

8. A non-transitory computer readable recording medium storing an encryption processing program causing an encryption processing system including an encryption data generation device having at least one first processor, an encryption processing device having at least one second processor, and a processing result utilization device having at least one third processor to perform an encryption processing comprising:
- preprocessing, with the at least one first processor, by generating encrypted data of homomorphic encryption corresponding to data obtained by multiplying plaintext data as a target to be processed, by a power of a predetermined number of two or more;
- acquiring, with the at least one second processor, the encrypted data from the encryption data generation device;
- executing, with the at least one second processor, a processing on the encrypted data in an encrypted state to obtain a processing result in the encrypted state;
- acquiring, with the at least one third processor, the processing result from the encryption processing device; and
- postprocessing, with the at least one third processor, by decrypting data of the processing result in the encrypted state and by dividing the decrypted data by the power of the predetermined number of two or more,
- wherein the processing executed by the at least one second processor includes at least one partial processing of executing an operation in a ciphertext space that corresponds to an operation of multiplying data corresponding to the encrypted data by a multiplier, the multiplier having been converted to an integer by multiplying a predetermined setting value by a predetermined adjustment value, and
- the at least one second processor further executes an operation in the ciphertext space that corresponds to an operation of multiplying data corresponding to the encrypted data by an inverse element of a cumulative adjustment value used in the processing executed by the at least one second processor, wherein the cumulative adjustment value is obtained by multiplying all necessary adjustment values used for cumulative multiplication.

* * * * *